(12) United States Patent
Shapiro

(10) Patent No.: US 6,991,249 B2
(45) Date of Patent: Jan. 31, 2006

(54) FOLD FLAT CHILD AND CARGO CARRIER TRAILERS AND STROLLERS, INCLUDING PIVOTING WHEEL AXLES

(76) Inventor: Richard N. Shapiro, 1668 Dey Cove, Virginia Beach, VA (US) 23454

( * ) Notice: Subject to any disclaimer, the term of this patent is extended or adjusted under 35 U.S.C. 154(b) by 140 days.

(21) Appl. No.: 10/361,492

(22) Filed: Feb. 11, 2003

(65) Prior Publication Data

US 2003/0127835 A1    Jul. 10, 2003

Related U.S. Application Data

(63) Continuation-in-part of application No. 09/604,769, filed on Jun. 28, 2000, now Pat. No. 6,581,945.

(51) Int. Cl.
*B62B 3/02* (2006.01)
(52) U.S. Cl. ............... 280/648; 280/650; 280/47.34
(58) Field of Classification Search ............. 280/639, 280/646, 648, 39, 287, 656
See application file for complete search history.

(56) References Cited

U.S. PATENT DOCUMENTS

| | | | | |
|---|---|---|---|---|
| 125,126 A | * | 4/1872 | Eastman | 280/39 |
| 908,472 A | * | 1/1909 | Lyons | 280/40 |
| 1,017,983 A | * | 2/1912 | Long | 280/37 |
| 2,437,380 A | * | 3/1948 | Cooklin et al. | 280/37 |
| 2,456,013 A | * | 12/1948 | Witt | 296/181.7 |
| 2,469,506 A | * | 5/1949 | Kerr et al. | 280/489 |
| 2,525,506 A | * | 10/1950 | Wiedman | 280/82 |
| 2,767,996 A | * | 10/1956 | Seyforth | 280/40 |
| 2,781,225 A | * | 2/1957 | Heideman | 280/642 |
| 2,802,672 A | * | 8/1957 | D Angelo | 280/40 |
| 2,879,072 A | * | 3/1959 | Rear et al. | 280/40 |
| 3,367,675 A | * | 2/1968 | Gearin | 280/639 |
| 3,400,942 A | * | 9/1968 | Hull | 280/39 |
| 3,451,690 A | * | 6/1969 | Cravens | 280/40 |
| 4,109,926 A | * | 8/1978 | Lane | 280/39 |
| 4,230,340 A | * | 10/1980 | Wasservogel | 280/656 |
| 4,340,124 A | * | 7/1982 | Leonard | 180/208 |
| 4,624,467 A | * | 11/1986 | Burns | 280/40 |
| 4,659,096 A | * | 4/1987 | Leimgruber | 280/39 |
| 4,705,280 A | * | 11/1987 | Burns | 280/40 |
| 4,887,836 A | * | 12/1989 | Simjian | 280/651 |
| 5,020,814 A | * | 6/1991 | George et al. | 280/204 |
| 5,267,744 A | * | 12/1993 | Berry et al. | 280/204 |
| 5,941,542 A | * | 8/1999 | Kalman | 280/38 |
| 5,979,921 A | * | 11/1999 | Derven et al. | 280/204 |
| 6,010,145 A | * | 1/2000 | Liu | 280/655.1 |
| 6,053,515 A | * | 4/2000 | Kelley | 280/47.18 |
| 6,164,683 A | * | 12/2000 | Kalman | 280/656 |
| 6,585,285 B2 | * | 7/2003 | Koch | 280/656 |
| 6,705,628 B2 | * | 3/2004 | Kahmann | 280/204 |

* cited by examiner

*Primary Examiner*—Christopher P. Ellis
*Assistant Examiner*—Bridget Avery

(57) ABSTRACT

Fold flat wheeled child and cargo carriers adopting pivoting, stowable wheel axles are disclosed, of the general type which may be trailed behind other devices by a stowable and removable tow bar. The carriers may be trailed behind other devices, or are convertible to strollers or push/pull style devices. The pivoting wheel axles in various embodiments, include simple manually manipulable methods to latch each wheel in the operative or stowed flat positions, which effectively allows the device to fold to an ultra-thin profile without any wheel being detached, and the wheel axles and tires, in the stowed positions also secondarily serve to retain the various folding parts in their stowed positions within the device side elevational profile. In the child trailer and cargo carriers, the tow bar, carrier walls and associated parts all fold flat to the device frame, along with the wheel axles and tires. Associated innovations include stowable push/pull handles, fold flat forward wheel axle structures, and details of the internal components of the pivoting wheel casing and its support.

44 Claims, 8 Drawing Sheets

FOLD FLAT CHILD AND CARGO CARRIER TRAILERS AND STROLLERS, INCLUDING PIVOTING WHEEL AXLES

RELATIONSHIP TO OTHER APPLICATIONS

This application is a continuation-in-part of U.S. patent application Ser. No. 09/604,769, filed on Jun. 28, 2000 now U.S. Pat. No. 6,581,945.

Previous U.S. applications by the same inventor include Ser. No. 09/271,274 filed on Mar. 17, 1999, now U.S. Pat. No. 6,220,611, granted Apr. 24, 2001; as well as U.S. patent application Ser. No. 09/604,769, filed on Jun. 28, 2000; U.S. application Ser. No. 10/143,831, filed on May 14, 2002; U.S. application Ser. No. 10/157,980, filed on May 31, 2002; U.S. application Ser. No. 10/323,892, filed on Dec. 14, 2002; and U.S. application Ser. No. 10/346,112, filed on Jan. 17, 2003.

FIELD OF THE INVENTION

The present invention relates to wheeled carrier devices, specifically including child carriers as well as cargo carriers with tow bars, which devices may be towed behind a wheeled device, a motive-powered device, an animal, or alternatively may be pushed or pulled with a handle. The inventions relate to methods to stow and pivot wheels, as well as all component parts of such devices, and otherwise create ultra-thin stowed profiles for such carrier devices.

BACKGROUND OF THE INVENTION

In U.S. Pat. No. 6,220,611, granted Apr. 24, 2001, the applicant disclosed unique methods relating to pivoting and stowable wheel axle assemblies for wagons and carts, and related innovations. Improvements were further disclosed in the continuation-in-part U.S. patent application Ser. No. 09/604,769 (carrier and stroller devices) and other applications referenced above. This application provides further refinements and enhancements to foldable child and cargo carrier trailer and stroller devices with tow bars which include pivoting wheel axles. Many of the enhancements here relate to partly or fully covered enclosed child carrier devices, as well as folding, removable wall cargo carrier devices which may be trailed with a tow bar behind a separate device, or alternatively may be pushed or pulled.

SUMMARY OF THE INVENTION

It is one object of this invention to provide for innovations relating to methods to stow wheels and all component parts on child or cargo carriers, which are trailed behind separate devices, or also may be convertible to push-or-pull stroller devices.

It is another object of the invention to provide for the simple folding of all components, walls and parts of such enclosed child carriers, including the tow bar as well as all wheels, and to create ultra-thin stowed profiles for all such component parts, allowing such device to be conveniently stowed in a vehicle trunk, against a wall, or on a hook, as but a few examples.

It is another object of the invention to provide that such covered child carrier devices, when in their stowed position, may be nested upon each other.

It is another object of the invention that the covered child carrier device may be either trailed behind a wheeled vehicle, or alternatively, at least one other wheel may be folded into an operative position, allowing such child carrier device alternatively to be pushed or pulled with a handle like a stroller.

It is another object of the invention to provide for alternative types of wheel axle support structures or for tandem wheels to be made a part of the pivoting wheel structure.

It is another object of the invention to allow the tow bar to be used as a push or pull handle rather than to be trailed behind a separate wheeled device.

It is another object of the invention to provide for a component part of the rear wall frame of the device to also serve as a push or pull handle, and for such handle to be manipulable or movable into multiple positions.

It is another object of the invention to allow for the folding side and rear wall components of said covered child carrier to be alternatively removable, and to include flexible roof and entry flap construction.

It is another object of the invention to allow for a portion of the frame of the child carrier device to serve as a lift handle or alternatively to receive a hook or other structures so that the stowed device may be hung from a hook on a wall.

It is another object of the invention to allow for the pivoting wheel assemblies to lock in the stowed position and to serve as a retention component to retain other portions of the carrier device in a stowed profile.

It is another object of the invention to alternatively allow the stowed wheels to overlay or partially sandwich over each other.

It is another object of the invention to provide for wheel support brackets which engage the pivoting wheel casing, and a simple method for the dowel structure which holds the wheel casing to be retained between a pair of such wheel supports.

It is another object of the invention to provide for at least one additional forward wheel for any other carrier device disclosed herein, and a simple method for such wheel structure to stow in a profile such that the entire axis of rotation and wheel structure is closely adjacent to the retention element of the carrier devices so that the wheel stows within the side-elevational profile.

It is another object of the invention to provide for a cargo carrier which may be trailed behind a separate device, or provide that such cargo carrier may alternatively include two straight handle members or a U-shaped retractable handle, and one or more underside supports, which underside supports nest and stow into the side-elevational profile of such carrier.

It is another object of the invention that the folding walls on the cargo carrier embodiment may be selectively removable.

It is another object of the invention to provide for simple methods to provide for all latch and lock structures of the pivoting wheel assembly to be maintained within the wheel casing, and to provide for several methods which allow for the simple manufacture of such wheel assembly casings and brackets.

These and other improvements may become apparent by virtue of descriptions contained herein.

BRIEF DESCRIPTION OF THE DRAWINGS

FIG. 4-B is an end-elevational perspective, in section, showing an alternative axle and tandem wheel structure;

DESCRIPTION OF THE PREFERRED EMBODIMENTS

Figure 1:
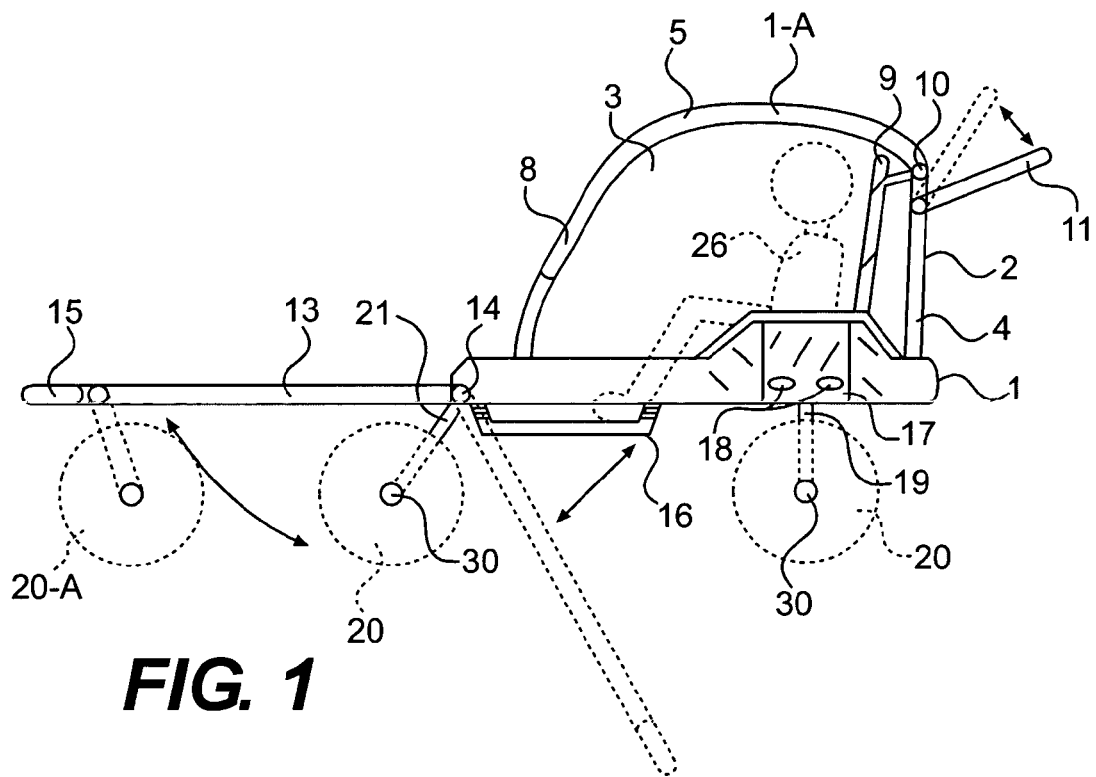
FIG. 1 is a side-elevational view of the child carrier device 1-A, partially in section, in the operative position, and is the preferred cover page figure.
Figure 2:
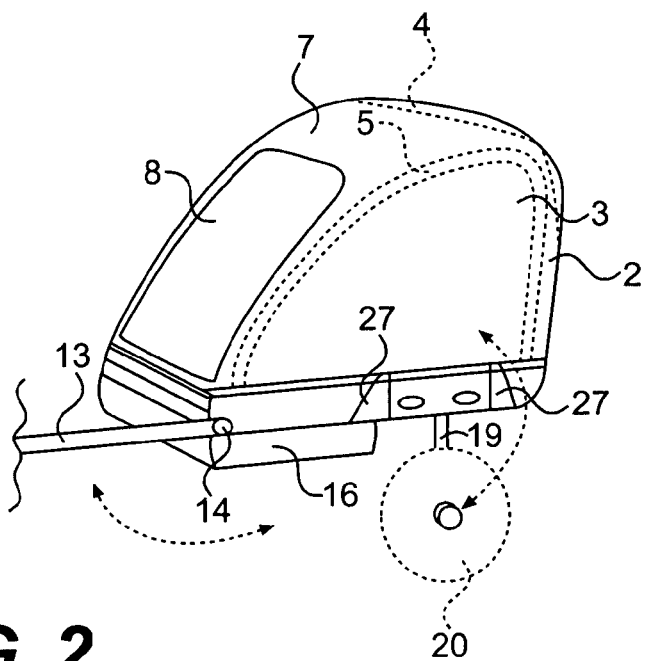
FIG. 2 is another side-elevational view of device 1-A, slightly elevated, isolating certain other components including the forward access area.
Figure 3:
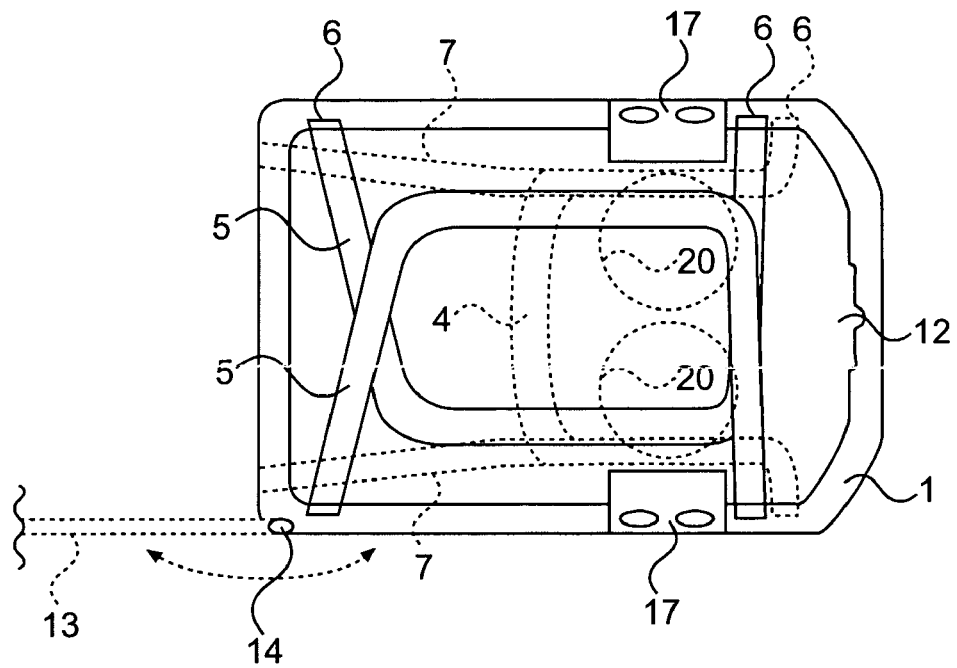
FIG. 3 is a top-plan view, isolating the side frame components, showing a ghost perspective of the rear frame and cover components, and omitting certain other components.

FIGS. 1 through 3 show the various components of a child carrier (1-A) with folding components and pivoting wheel axles, in which all component parts fold into the side-elevational profile of the frame of said structure. Referring first to FIG. 1 is shown the child or person carrier (1-A) which includes a frame structure, 1, and the carrier as shown in various figures includes at least partial surrounding walls. The two side walls, 3, may be constructed of any suitable material and may or may not include a side wall frame, 5 (See FIG. 2 ghost perspective), and the rear wall shown in FIG. 1 at 2, may be also constructed of any suitable material and in the embodiment shown may include a continuation of the rear frame material to form at least a partial roof and forward entry area indicated at 7 in FIG. 1. An entry flap may be formed from a portion of the material shown at 8 in FIGS. 1 and 2. The side walls may include a frame material, 5, which folds into the side-elevational profile of the device (FIG. 3). Also, FIG. 3 shows that in the folded and stowed position, the rear frame, 4 (ghost perspective in FIG. 3), also folds into the side-elevational profile along with the rear wall material, 2, and the roof and entry material, 7, all of which are shown in ghost perspective folded in FIG. 3. This rear frame and roof and forward entry material may all be folded either below the level of the side frame, 5, or alternatively above and over side frame, 5. Each of said side and rear frames pivot and fold along an aspect of the frame, 1, along pivot points, 6, indicated in FIG. 3. The pivot points may be at any aspect of the frame. FIG. 1 also shows that a rear wall seat back, 9, may be formed forward of the rear wall material, 2. Alternatively, no separate rear wall seat back may be included, but rather the rear wall seat back may be formed as a component part of the rear frame material, 2, and may retain child restraints. In either scenario, the seat back, 9, whether separate or constructed as part of the rear frame material, is designed to also fold into the side-elevational profile with the frame, 1, when stowed.

One of the innovations of the disclosures involves the addition of the pivoting wheel axle assembly to the carrier device. Referring to FIGS. 1, 2, and 3, is shown a pivoting wheel casing, 17, which includes a pair of wheel casing finger latch access holes, 18 (although a single access hole and single latch may alternatively be included), and a wheel axle, 19, travels through a portion of the pivoting wheel casing, 17, and at one end is connected to the axis of rotation of a wheel and tire, 20. The wheel axle, 19, at its opposite end from the axis of rotation of the tire, terminates along a portion of the pivoting wheel casing, 19 (details of the wheel casing are included in FIG. 12). The pivoting wheel axle and entire assembly are shown in their operative position in FIGS. 1 and 2, and FIG. 3 demonstrates the stowed position of two rear wheels (other number of tires and configurations may be included). In operation, the user may squeeze the wheel casing finger latch access holes, 18, to unlock the wheel, 20, from its operative position shown in FIG. 1, after the user has folded and stowed all other folding side and rear wall frame components, and then the wheels, 20, pivot and stow within the side-elevational profile of the carrier device, 1-A, as shown in FIG. 3. It is noted that the preferred structure of the pivoting wheels involves motion of 270° between the stowed and operative positions, but alternatively, the wheels may stow in a 90° pivot and still be latched within the side-elevational profile of the device. Referring to FIG. 3, the wheel casings are shown in their stowed position, and all component parts are retained within the side-elevational profile of the device because of the latched wheels, 20, in their stowed position as shown. In the particular embodiment shown, the user would squeeze the access holes internal latch, 35 (described in FIG. 12), and place the wheels into their operative position and then move each of the frame portions and materials into upright operative position. Any number of connectors, 10 (See FIG. 1), may be utilized to hold the side frames, 5, in an upright position, in conjunction with a locking orientation with the rear wall frame, 4. Any suitable type of connectors may be used, which may be integrated within the wall structures, or may be hook and loop fasteners, a lanyard with a pin, as but several examples. The number of connectors may vary depending on the configuration chosen. As shown in FIG. 3, the frame may be suitably formed in any location, such that an ergonomically convenient handle, 12, is formed to carry the device when it is stowed and folded. Further, the handle portion, 12, may be further formed to allow for a portion that will hang conveniently on a hook if the vehicle is stowed on a wall.

Figure 5:
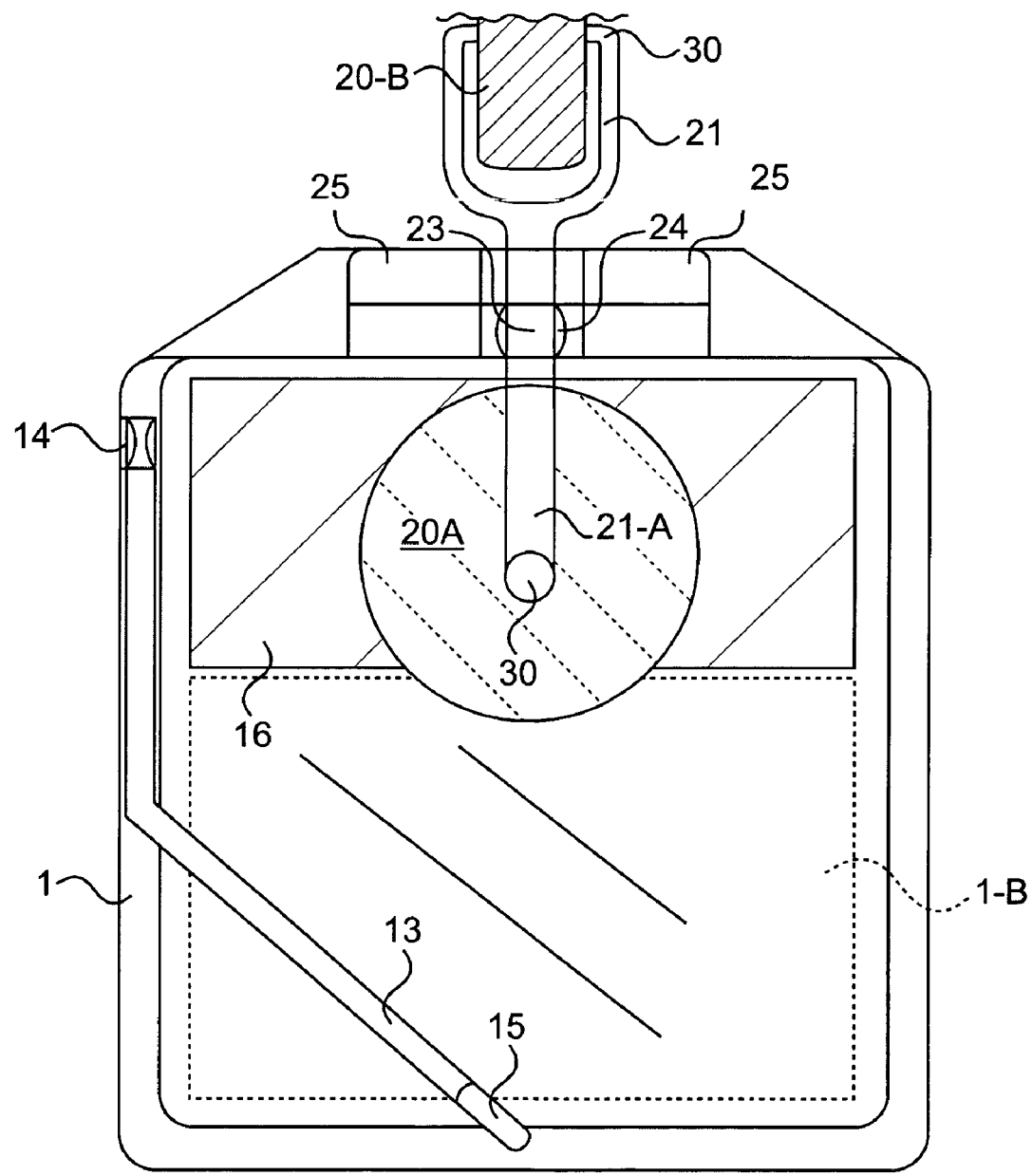
FIG. 5 is another top-plan perspective of the child carrier 1-A, viewed from the underside, isolating the alternative stowable wheel and tire structure, as well as the stowable tow bar.

Referring to FIG. 1, there is also shown a pivotable rear wall frame handle, 11, which may be formed from the rear wall frame, 4, or may be a separate component. This push-and-pull handle may alternatively also pivot up to 180° or more to facilitate stowing of the handle flush with the rear wall frame, 4 (as shown in FIG. 2 in the operative position, and in ghost perspective in FIG. 3 in a folded down position). In operation, the handle, 11, is designed so that when the rear frame material is folded down, if an optional handle is employed, it folds flush within the side-elevational profile along with the frame material, 4, as shown in FIG. 3, although the handle itself is not shown in that figure. In the design shown in FIG. 1, the handle may be included where the device is not towed behind a separate wheeled device or motive power device. In such circumstance, an alternative forward wheel is employed as shown in FIG. 1, which includes a forward wheel axle and fork, 21. The alternative forward wheel also has a folding design which permits the entire forward tire, 20, to move and stow with the axis of rotation inside the side-elevational profile of the frame, 1, and with the tire substantially within the side-elevational profile as well, as shown in FIG. 5. Details of the forward wheel structure are discussed further at FIG. 5. The child or person carrier, 1-A, includes a pivotable tow bar, 13, shown in FIGS. 1, 2, and 3. The tow bar includes a pivot, shown at 14, which allows the tow bar, 13, to be moved and stowed wholly within the side-elevational profile of the frame, 1. Preferably, the tow bar stows to the underside of the frame, but it may alternatively stow to the top side (not shown). Said tow bar, 13, may be selectively removable at the pivot point, 14, but in the operative position, the tow bar, 13, connects to a separate device by virtue of a tow bar connector, 15, shown in FIG. 1. Typically, the carrier would be connected to a wheeled device although it is anticipated that the carrier may be connected to and pulled by an animal or any other type of motor-powered device (not shown). As shown in FIGS. 1 and 2, the device may also include a flexible foot protector component, 16, designed to allow for the feet of a person, 26 (shown in FIG. 1), to project downward. Not shown in FIGS. 1 through 3 is at least a partial retention base or floor structure, 1-B, which may be included and connected at any points along the inner aspect of the frame, 1. The at least partial base may be a formed, rigid material, or may be of a flexible fabric material so at least a portion of the base, 1-B, retains a child, person or cargo within the device. The foot protector structure, 16, may be constructed of a rigid or flexible material. When the device is in its stowed or folded position, generally shown in FIG. 3, all component parts, including the foot protector, 16, move and stow in the side-elevational profile of the frame, 1. The foot protector area, 16, may also be used to stow cargo.

Again, FIG. 1 shows a forward wheel, 20, and forward wheel axle fork, 21, in a ghost perspective in an operative position. FIG. 5 shows more detail of the operative and folded or stowed position of a forward optional wheel, 20-A. Referring to FIG. 5, the forward wheel is shown in an operative position with a two-sided forward wheel axle fork as shown at 21 (although a single-sided axle may be adopted). The forward wheel axle, 21, is mounted a portion of the frame, 1, which includes a forward wheel axle pivot point and rotation point, 23. A forward wheel axle latch, 24, is accessible from the opposite or top side of the frame, 1, and is manipulated by the user in order to free the forward wheel, 20, from its operative position, and once the wheel is freed by virtue of manipulation of the latch, 24, the user rotates the tire 90° along its axis of rotation, 30, and the user then pivots the forward axle, 21, along the forward wheel axle pivot point, 23, in order to position the tire parallel with and closely adjacent to the support frame, 1, and at the same time, also orients the tire into a parallel relationship with the overall device frame, 1. At such point as the tire is closely parallel with the frame, 1, and substantially within the side-elevational profile of the frame, the forward wheel axle latch, 24, automatically locks the wheel into the stowed profile described. In order to release said forward wheel from this stowed profile, the user manipulates latch, 24, and reverses the process described to place the forward wheel, 20-A (shown in ghost perspective stowed in FIG. 5), into its operative position (shown at 20-B in the same figure). The entire forward wheel structure just described in FIG. 5 is also supported by a forward wheel axle brace, 21-A, which is further supported by the support frame brace, 25. FIG. 5, showing the underside of the carrier device, 1-A, also shows the tow bar, 13, in a stowed position, having pivoted along the pivot point, 14. Other configurations for the tow bar may be included so that it generally stows within the side-elevational profile of the frame, 1. The flexible foot protector section, 16, is shown which is held within the side elevational profile by gravity or alternatively also by the optional forward wheel, 20-A. Last, at least a partial base may be included of any suitable material, shown at 1-B, connected to any portion of the frame, 1.

Figure 4A:
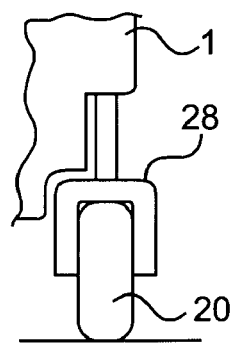
FIG. 4-A is an end-elevational perspective, in section, isolating one alternative axle structure and tire.
Figure 4B:
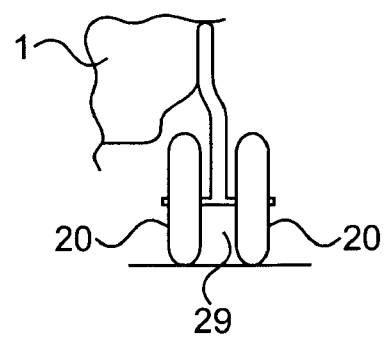

FIGS. 4-A and 4-B show two alternative potential wheel configurations for any of the wheels, whether the forward or rear wheels. Referring to FIG. 4-A, a portion of the carrier frame, 1, is shown, and the tire, 20, is shown in an operative position, where a two-sided wheel axle and fork configuration is shown at 28. In 4-B, a portion of the carrier frame, 1, is also shown, and in this configuration is shown a pair of tires, 20, joined by a central and single axle which includes a cross member which passes through the axis of rotation of the pair of tires, 20. Each of the wheel-axle configurations, 4-A and 4-B, also are designed to pivot and stow within the side-elevational profile of the carrier device (not shown here).

Figure 8:
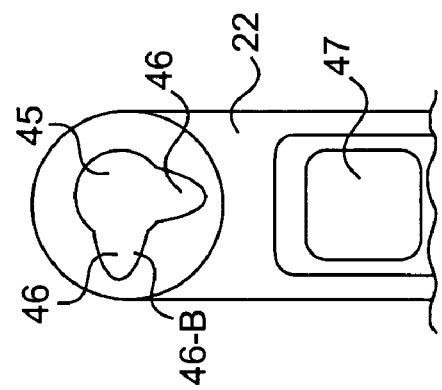
FIG. 8 is an end-elevational perspective of the pivoting wheel support, isolating only a limited number of features.
Figure 7:
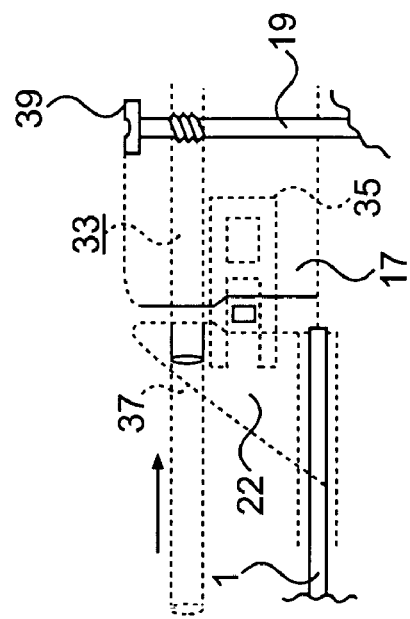
FIG. 7 is a side-elevational profile, in cross section, isolating certain components of the pivoting wheel support as well as the pivoting wheel casing.
Figure 6:
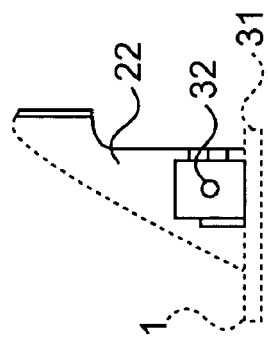
FIG. 6 is a broken-away perspective of the pivoting wheel support in a side-elevational perspective.

FIGS. 6, 7, and 8 are directed to one embodiment for the structure of the mounting support of the wheel casing mounting supports for the pivoting wheel axle. FIG. 6 shows one side of a wheel casing support, 22. Wheel casing support, 22, may be constructed of any material, including metal or plastic or others, and not shown is the opposite side which also would be required. The support may include one or more wheel support base tabs so that the wheel casing support, 22, may be mounted through an opening or recess through the frame, and then welded into position (in metal structures) or may be screwed or resiliently placed in position in any other type of structure (not shown). The fastening method is not shown in FIG. 6 or 7, but the support may include any suitable side tabs to be welded in the case of metallic structures, or in the case of non-metallic structures, resilient methods or screw and bolt methods may be engaged, or the supports, 22, may be wholly integrated as part of the shape of the support frame, 1 (not shown). FIG. 7 shows further detail of the placement of the wheel support, 22, adjacent to an actual pivoting wheel casing, 17, shown in cross section to orient internal parts. Only one side of the wheel support casing, 22, is shown, and only a portion of the pivoting wheel casing, 17, is shown, which includes the wheel axle, 19, traveling longitudinally through the wheel casing and shows the axle nut, 39, which nut is received on any suitable threaded axle portion, 38, of the wheel axle, 19, closing off the wheel axle, 19. A round wheel support dowel-type structure, 33, is the lateral component which retains the wheel casing, 17, along its pivot point, 45, which is a cylindrical portion of the wheel support casing, 22, shown in FIG. 8 at 45, which is the wheel support central dowel opening. Once a pair of the wheel support casings, 22, are placed on opposite sides of the pivoting wheel casing, 17, and formed as part of the overall frame structure, 1, the dowel, 33, may be placed through the pair of wheel support central dowel openings, 45, and the dowel, 33, also passes through suitable openings in the wheel support casings, 17. Further, an opening of any suitable shape may be formed completely through the central aspect of the dowel, 33, through which the wheel axle, 19, travels before being capped off with a suitable nut structure, 39, which nut is received on any suitable threaded axle portion, 38, of the wheel axle, 19 (See FIG. 12). In this manner, the pivoting wheel casing, 17, is secured in position. The wheel axle, 19, is also secured in position, and the dowel, 33, is also secured. FIG. 8 is an end-elevational view of a portion of a wheel casing support, 22. 47 indicates a formed opening of the wheel casing that receives a latch or locking structure, 35, which would normally be spring-biased and secured inside the pivoting wheel casing, 17. The opening, 47, would receive a portion of the latch and lock structure, 35, when the pivoting wheel casing, 17, is in its operative position.

Figure 12:
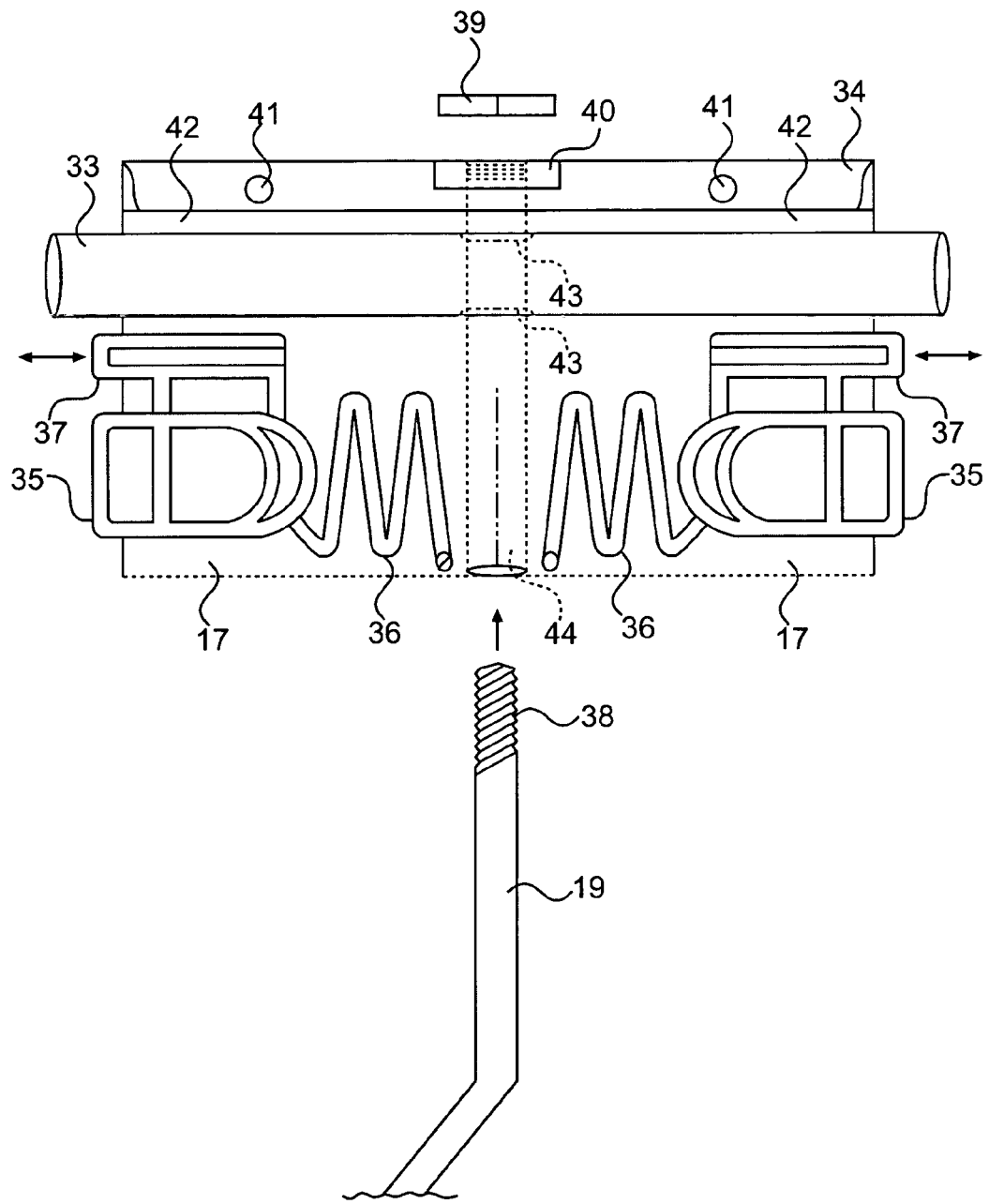
FIG. 12 is a side-elevational view, broken away, in cross section, isolating the pivoting wheel casings' internal components.

Referring now to FIG. 12 as well as FIGS. 7 and 8, the inner mechanics of pivoting wheel casing, 17 (not shown). Openings, 43, are shown through the central aspect of the dowel, 33, and the wheel axle, 19, travels through the dowel and it terminates with any suitable nut or cap, 39, which nut is received on any suitable threaded axle portion, 38, of the wheel axle, 19. A pair of wheel latches, 35, are shown which include central portions that are accessible by a user when the outer wheel casing, 17, surrounds both of the latches (leaving the access holes, 18, shown in FIG. 1). Each wheel latch, 35, includes a specially shaped lock portion, 37. The entire latch, 35, is spring-biased by an integrated spring structure shown at 36, or alternatively by a separate spring structure which is mounted to the latch, 35 (not shown here). The entire wheel casing, 17, may be a unitary construction, or may include a top cover, 34, which may include one or more holes, 41, which match up with holes in the wheel casing, 17 (matching holes not shown). Once the internal parts shown in FIG. 12 are placed inside the wheel casing, 17, the top cover (or alternatively, any other type of side or bottom cover) may be placed to seal the casing. FIG. 12 also shows an alternative sleeve, 44, which may surround the metal axle, 19, and be constructed of any suitable material. This is an optional addition. FIG. 12 importantly shows specially constructed lock portions, 37, which are constructed as a component part of the wheel latch, 35. The lock structure, 37, serves an important function of locking the wheel casing when in the stowed position (stowed position is generally shown in both FIG. 3 and in FIG. 10). When the wheel casing, 17, pivots and travels into its stowed position, there are specially formed recesses, 46, which are shown in FIG. 8 which surround the central dowel opening, 45. As the dowel, 33, travels inside the dowel opening, 45 (which opening is a part of the casing support, 22), the lock portion, 37, of the latch component, 35, arrives at the opening shown in FIG. 8 at 46-B, and because of the opening, the lock portion, 37, springs outward, locking the wheel casing and wheel into its stowed position. Accordingly, the user must squeeze the wheel latch, 35, inward, towards the center of the wheel casing, 17, in order to free the wheel casing from the stowed position in order to pivot it into its operative position. Although the configuration in FIG. 12 is shown, it is realized that single-sided latches or various other configurations may be employed to adapt the same innovation which results in the wheel casing locked in the stowed position within the side-elevational profile of the device.

Figure 9:
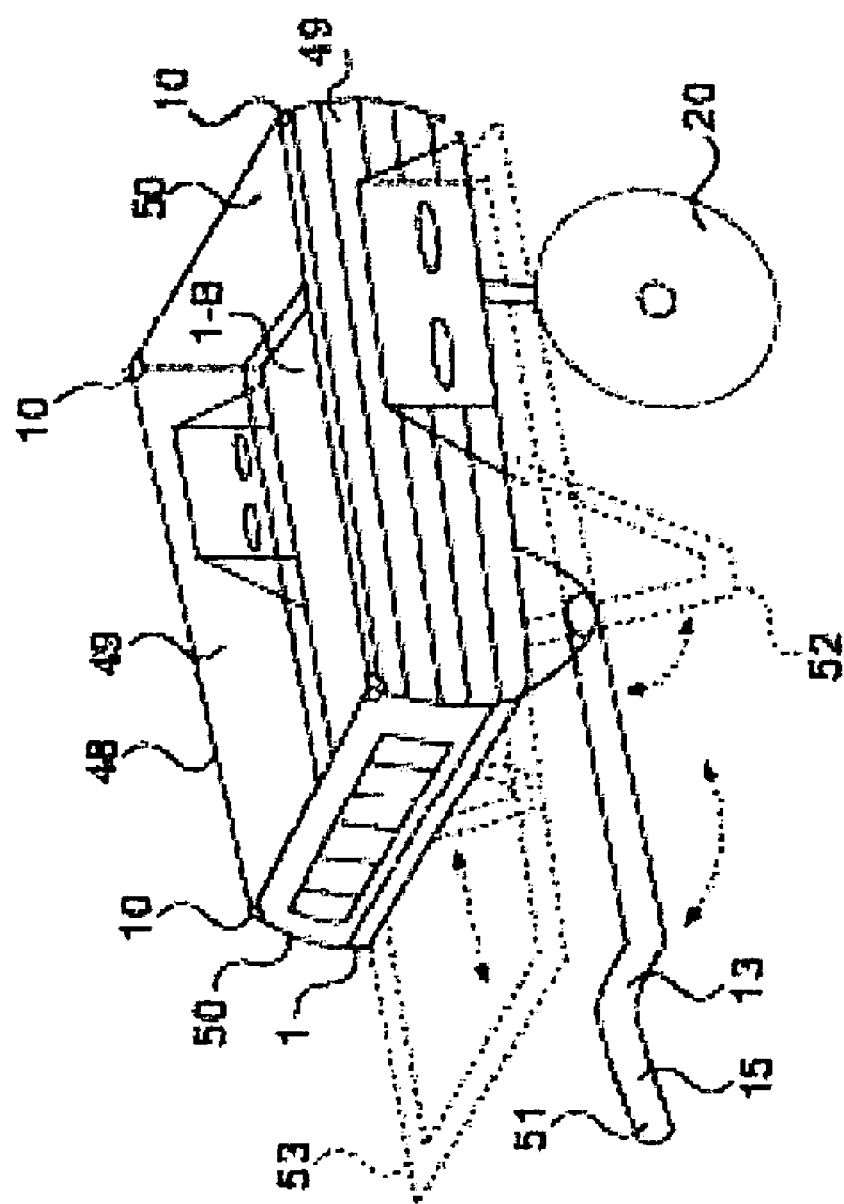
FIG. 9 is a slightly elevated side-and end-elevational view of the cargo carrier device, 48, in a fully operative position, including alternative components.
Figure 10:
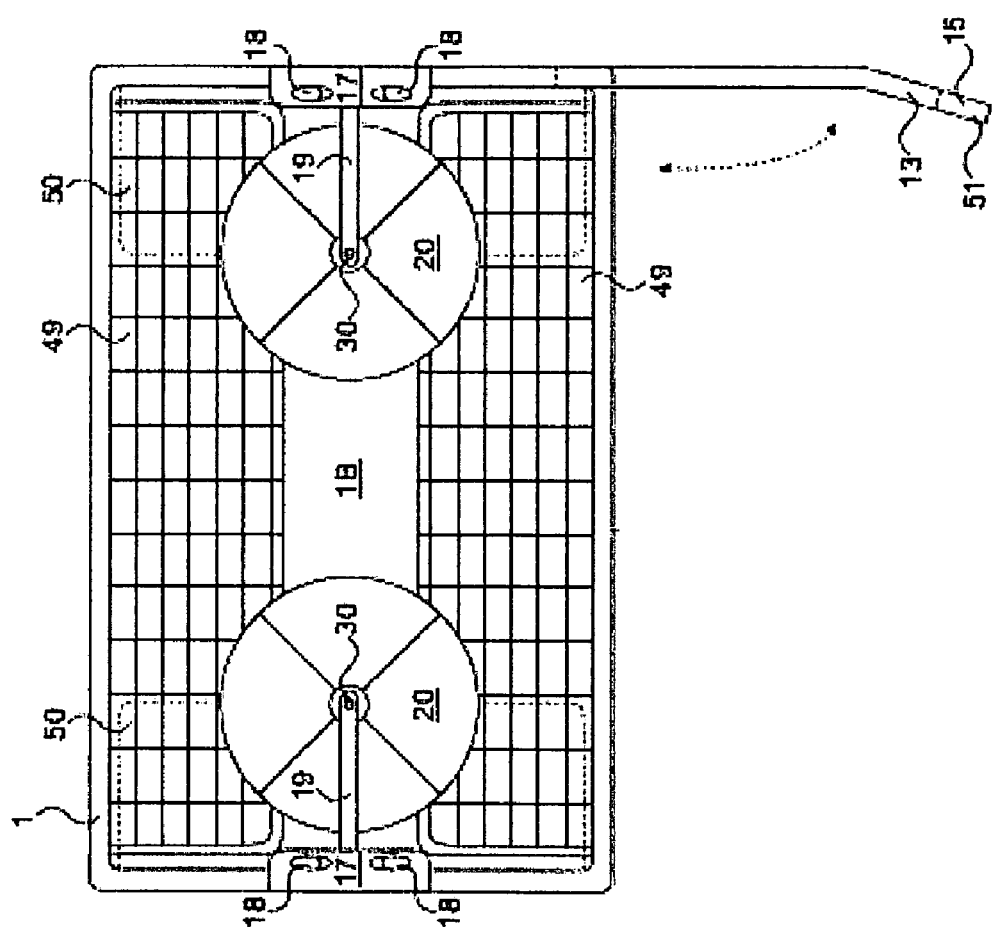
FIG. 10 is a top-plan perspective of cargo carrier device, 48, showing the wall and wheel components in a completely stowed position.
Figure 11:
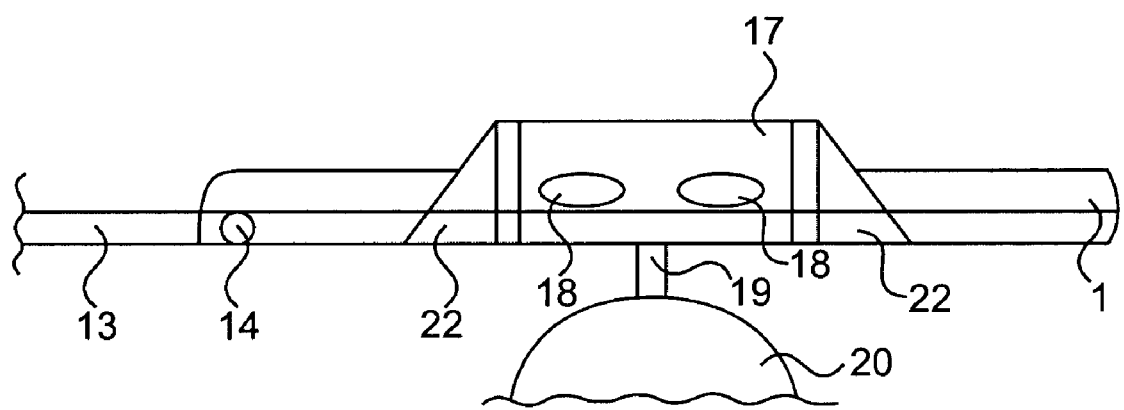
FIG. 11 is a side-elevational perspective of said cargo carrier, 48, with all walls folded and stowed.

Referring to FIGS. 9, 10, and 11, an alternative embodiment of the carrier device is denoted as 48 in FIG. 9, and is a folding wall cargo carrier with walls that are alternatively and selectively removable. It shares a number of common features with the child carrier 1-A but has several different features. The device includes a frame, 1, and at least two tires, 20, which are mounted on wheel axles, 19, also interconnected to pivoting wheel casings, 17, which also include the wheel casing finger latch access holes, 18, described earlier. When the wheels are stowed, the axis of rotation, 30, of each tire, 20, is stowed within the side-elevational profile of the device, and all folding walls also are stowed within side elevational profile of the frame, 1. Referring to FIG. 9, the walls, 49, and walls, 50, are shown in their operative, upright positions. Any series of suitable connectors, 10, may be employed to retain the walls in their upright position as shown. Any connectors may be employed, including loop and hook fasteners, pins with lanyards, metal sliding right angle pins, or retention elements integrated into the adjacent wall structures, etc. (not shown). The device, 48, may be towed behind a separate wheeled device or motive device or animal. A tow bar, 13, includes any suitable connector, 15, to connect carrier, 48, to the separate object. Also, as described earlier, the tow bar may pivot, move, or fold into a stowed position in the side-elevational profile of the carrier device. Alternatively, the end of the tow bar, 13, may include a handle-like structure, 51, to allow a user to simply pull or push the carrier device when it is not connected to separate wheeled device. Alternatively, FIG. 9 shows that the tow bar, 13, maybe moved, pivoted, or stowed, allowing the device to be pushed or pulled as a two-wheeled or multi-wheeled carrier device. In such an alternative circumstance, a series of one or more carrier underside folding supports, 52, may be employed. In ghost perspective in FIG. 9, these are included in an operative position. The stowed position is not shown in FIG. 9, but simple 90.degree. movement of the underside folding supports allows them to stow within the side-elevational profile of the device along the base structure 1-B (not shown). Another alternative optional portion of the carrier device, 48, is a stowable U-shaped handle, 53, shown in ghost perspective in FIG. 9. The device may alternatively include a U-shaped handle which is slidably mounted along any aspect of the carrier frame, 1, or along the base, 1-B. When not in use, the U-shaped handle is retracted and closely adjacent to the frame or underside as previously described. In use, the U-shaped handle may be extended and used as a push-pull handle with appropriate securement of a portion of the U-shaped handle to the carrier device (not shown). It is appreciated that the push or pull handle may be two straight handles retractably and slidably disposed along the carrier device as opposed to a U-shaped handle (not shown). Also, as shown at 50-A, an alternative folding end wall may be employed with an elongated vertical shape. This alternative end wall 50-A may have the additional utility of being foldable and movable outward as shown at 50-B, where it may serve as a ramp to the rolling surface, and also have the same folding function (to stow) as the other folding walls.

FIG. 10 shows completely stowed carrier device, 48, with the exception of the tow bar, 13, in the extended position. Not shown in FIG. 10 is that the tow bar, 13, in the stowed position, would be within the side-elevational profile of the device to the underside. FIG. 10 shows one embodiment of the folding wall structures of the carrier device, 48. It is notable that in the rectangular-shaped embodiment shown in FIG. 10, the end walls, 50, are actually shorter in length than the side walls, 49. Naturally, a square or rectangular shape may be adapted. In any case, in FIG. 10, all of the walls stow within the side-elevational profile and may be mounted to any suitable aspect of the frame, 1. A complete or partial base, 1-B, maybe included and is also mounted to an aspect of the frame, 1. The latching of the tires, 20, as previously described, may secure all folded walls below the level of the stowed tires, 20. Alternatively, not shown, the pivoting wheel may also serve to stow the tow bar, 13, under its periphery of the tire or the wheel casing, 17. To place the device in its operative position, referring to FIG. 10, the user would pivot the wheels into their operative position and then lift each of the walls to their upright position and secure them by virtue of the connectors, 10, discussed in FIG. 9.

FIG. 11 simply shows a side-elevational profile of the carrier device, 48, with the wheel or tire in its operative position prior to erection of any of the side walls. An alternative type of tow bar for the carrier device is shown in ghost outline at 13-A in FIG. 10. This style center pull tow bar, 13-A, is that style more commonly used in conjunction with various motor vehicle's which are equipped with a trailer hitch, shown at 54, which vehicle hitches may include a rounded ball shape end, 55. The alternative connecting tow bar or coupler 13-A includes a rounded receiving opening, 53 which secures the tow bar, 13-A, to the trailer hitch 54. Accordingly, the cargo carrier 48 may be adapted as a full size cargo carrier trailer used with any style motor vehicle or farm implement, yet is stowable for storage or transport in a fold flat configuration.

It is understood that components and embodiments of the cargo carrier, 48, may be employed in conjunction with any component parts of the child carrier, 1-A, and various elements may be interchanged or added to either of the two embodiments shown. Further, any particular configuration of tires or wheels may be employed that pivot, move, or stow. Also, more than one forward wheel structure shown in FIG. 5, may be employed on either of the carrier devices, 1-A or 48, or single or multiple rear wheels may be adapted. Also, although FIG. 10 shows two tires in a side-by-side relationship in their stowed positions, the tires may instead be partially overlaid or partially sandwich or completely sandwich each other in their stowed positions. Further, the child carrier may include space for one or more persons within the carrier. Also not shown is that a foot or parking brake may be included that applies friction to one or more of the tires on the child carrier, 1-A, or cargo carrier, 48, when a push or pull handle is adopted.

What is claimed is:

1. A wheeled carrier device comprising:
    a support frame defining a side elevational profile and an outer perimeter including at least a partial retention base;
    an interconnection trailing element selectively mountable and removable from said support frame;
    said trailing element, in a first operative position, serves to hitch said carrier device to a separate object providing rolling propulsion, to thereby couple the two together, and in a second, stowed position is moved to substantially within the side elevational profile of the device support frame; and
    a plurality of foldable and selectively removable wall structures at least partly mounted to the support frame, which in a first, operative position are erected and in a second stowed position all said wall structures move and collapse substantially within the side elevational profile of said support frame;
    at least two wheel assemblies affixed to said support frame, each wheel assembly including a base and a plurality of walls perpendicular thereto, defining both a wheel assembly periphery and an interior cavity; each wheel assembly in the operative position substantially occupies the side elevational profile of the support frame and each wheel assembly further includes both wheel assembly mounting means, and wheel attaching means interconnected to at least one wheel; and
    said wheel attaching means defining an elongate wheel support element connected to at least one wheel and the wheel's central axis of rotation, including a first lower end interconnected to the wheel's central axis of rotation and an uppermost portion affixed to the wheel assembly, the uppermost portion terminating in a second end, and said wheel assembly including a terminal fixing member disposed near to the second end of the wheel support element which secures said support element to the wheel assembly; and
    housed at least partially within the wheel assembly are transversely disposed, oppositely extending mounting elements, which are received in adjacent facing portions of the carrier device support frame, about which the wheel assembly pivots, and
    each said wheel assembly and interconnected wheel being movable between a first, latched operative position wherein said wheel is erected to provide rolling support for said carrier device and wherein the plane defined by said wheel assembly and interconnected wheel extends substantially orthogonally to the side elevational profile of the carrier device, and a second, stowed, latched position, the plane defined by said wheel assembly and interconnected wheel being swept through an angle during movement of said wheel assemblies between said first and second positions such that the plane defined by the wheel assembly and interconnected wheel in the second position extends substantially parallel with the side elevational profile of said carrier device, and said wheel as well as it's central axis of rotation, in the second position, being disposed within the outer perimeter defined by the carrier device support frame, and in the second, stowed position of said wheel assembly it is at least close to perpendicular to said wheel assembly's first operative position; and
    each wheel assembly includes at least one latching means which positively latches the wheel assembly against movement when in both the first and second positions, the latching means selectively engages a portion of the carrier device support frame, in both the first and second positions and a portion of the wheel assembly.

2. A device in accordance with claim 1 wherein the said wall structures, in their second, stowed positions are secured against movement between at least part of the retention base and at least part of at least one wheel assembly in the second, stowed and latched position of said wheel assembly.

3. A device in accordance with claim 1 which includes at least one forward most wheel support unit mounted at least partly to an aspect of the support frame, which further includes:
    at least one arm structure mounted to the axis of rotation of the forward most wheel;
    at least a portion of the at least one forward most wheel support unit further includes at least one brace;
    in a first, operative position said brace of said forward most wheel support unit at least partly abuts said support frame and the forward wheel is downwardly directed, and in a second, stowed wheel support unit position at least a part of said brace is detached from said abutment to said support frame, and
    the periphery of the forward most wheel of the wheel support unit is at least nearly within the perimeter of the support frame in the second, stowed position, and
    at least one latching means which positively latches the forward most wheel support unit against movement when in both the first and second positions.

4. A device in accordance with claim 1 wherein a forward most wheel and wheel support are mounted to the said interconnection trailing element.

5. A device in accordance with claim 1 wherein at least one forward wheel is downwardly directed and orthogonal to the retention base in a first, operative, latched position and when unlatched from said position, the wheel is rotated along its support axis approximately ninety degrees and moved into a second, stowed, latched, position near to parallel with the retention base, substantially within the side elevational profile of said support frame, and the periphery of the wheel is at least nearly within the perimeter of the support frame.

6. A device in accordance with claim 1 wherein the retention base forms at least one seat that accommodates at least one child.

7. A device in accordance with claim 1 wherein the retention base forms at least one shaped section which in a first operative position protrudes toward the rolling surface, which shaped section accommodates the feet of at least one occupant, and in a second, stowed position said section moves to within the side elevational profile of the support frame.

8. A device in accordance with claim 1 wherein at least two wheel assemblies are mounted on opposite sides of said support frame, the wheels of said two wheel assemblies, in the second, stowed, position of said two assemblies, being positioned in at least partially overlapping relation and being disposed at least close to being in a plane parallel with the side elevational profile of the support frame, and substantially within the perimeter defined by said support frame.

9. A device in accordance with claim 1 wherein said retention element retains cargo.

10. A device in accordance with claim 1 wherein said retention base retains at least one person.

11. A device in accordance with claim 1 which includes at least one underside support movable between a first operative position where it provides support between the device and the rolling surface, and a second, stowed position wherein the underside support stows substantially within the side elevational profile of the device frame.

12. A device in accordance with claim 1 which includes a push and pull handle secured to the carrier device, which is also movable from a first operative position, to a stowed position, substantially within the side elevational profile of the support frame.

13. A device in accordance with claim 1 which includes a grasping handle which is substantially "U"-shaped and is at least partly mounted to a shaped portion of the device support frame profile.

14. A device in accordance with claim 1 wherein at least one of said wheel assemblies includes means for fixating a support axle for the corresponding wheel so as to prevent axial rotation of the corresponding wheel.

15. A device in accordance with claim 1 wherein each said latching means, which provides latching in both the operative and stowed position, is one and the same means.

16. A device in accordance with claim 1 wherein the said releasable latching means is integrated into each of the wheel assemblies.

17. A device in accordance with claim 1 wherein the said releasable latching means is disposed within the side elevational profile of the carrier device.

18. A device in accordance with claim 1 wherein at least one wheel includes an outer rim and a central hub and said hub including a transverse opening therein, as well as said elongate wheel support element, and said wheel support element including a transverse portion at said first end received in said opening in said hub and forming an axle about which said wheel rotates, and a further portion extending orthogonally to said transverse portion and being received in said wheel assembly, said further portion terminating in said second end, and said wheel assembly including a cavity therein disposed adjacent to said second end, a terminal fixing member affixed to said second end of said support element and received in said cavity, said fixing member being of size and shape relative to that of said cavity so as to prevent rotation thereof in said cavity, whereby axial rotation of said further portion is prevented and thus said at least one wheel is prevented from rotation about said further portion and is limited to rotation about an axis formed by said first portion.

19. A device in accordance with claim 1 wherein not less than two of said carrier devices nest upon each other when the wheels and movable component parts of said devices are in their stowed positions.

20. A carrier device in accordance with claim 1 wherein said wheel assembly latching means are integrated as part of the wheel assemblies, and are accessible from either of two substantially parallel, opposing sides of the wheel assemblies.

21. A carrier device in accordance with claim 1 wherein at least one of the wall structures includes a substantially "U"-shaped support portion which further serves as a push and pull handle for the carrier device in a first, operative position, and in a second, stowed position of said wall structure, said wall structure and the substantially "U"-shaped handle are stowed substantially within the side-elevational profile of the support frame.

22. A carrier device in accordance with claim 1 wherein at least one wheel assembly supports a pair of wheels.

23. A carrier device in accordance with claim 1 wherein said trailing element also serves as a grasping handle.

24. A carrier device in accordance with claim 1 wherein at least one of the wall structures includes at least one shaped portion designed as a seat back for at least one occupant seated within the device when the device is in the operative position.

25. A carrier device in accordance with claim 1 wherein at least one of the wall structures includes material that is formed so as to provide an overhead covering which is interconnectable with at least one adjacent wall structure to substantially enclose the carrier device forming an interior space when the wall structures are in their first position.

26. A carrier device in accordance with claim 1 wherein the plurality of wall structures interconnect in the first, operative position, to form a covered, interior space including at least one entry portion which is selectively manipulable to provide access to the interior space of the carrier device.

27. A carrier device in accordance with claim 1 which carrier device support frame further includes a formed grasping portion for lifting said device when in the stowed profile.

28. A carrier device in accordance with claim 1 wherein a section of the support frame is shaped so that the stowed device hangs from a vertical surface projection along a shaped receiving portion of the device.

29. A carrier device in accordance with claim 1 wherein the wall structures, in said erected state, are connected together by hook and loop fasteners which are manually manipulable by a user.

30. A carrier device in accordance with claim 1 wherein the wall structures, in their erected state, are retained together by virtue of manually manipulable connectors attached to the contiguous portions of such wall structures.

31. A carrier device in accordance with claim 1 wherein at least one wheel assembly is secured in place along the support frame by wheel support brackets through which a pivot structure passes, and said pivot structure also passes transversely through spaced openings in the wheel assembly and specially spaced cavities within each of the wheel support brackets receive specially shaped portions of at least one latch mounted within said wheel assembly which specially shaped receiving portions serve to lock said wheel assembly in both the operative and the stowed position of said at least one wheel assembly.

32. A carrier device in accordance with claim 1 wherein as least one wheel assembly includes a pivot member passing through said wheel assembly transversely to opposing receiving portions of the support frame, and said wheel assembly receives an elongate wheel support element perpendicularly to said pivot member, traveling through said interior cavity of the wheel assembly, and said elongate wheel support element travels through an opening in said pivot member, and a terminal fixing member serves to secure the pivot member as well as the wheel assembly and the elongate wheel support element in relation to the carrier device support frame.

33. A device in accordance with claim 1 wherein at least one wall has a third further position and is hingedly connected to the support frame and is pivotable outwardly along at least one hinge so that said wall's free edge opposite the hingedly connected end is in contact with the rolling surface in said third wall position.

34. A device in accordance with claim 3 wherein at least one part of said brace is at least partly mounted to the underside of the support frame in said first position, causing gravitational force from downwardly applied weight to the retention element affixed to the support frame to maintain said first, operative position of at least one forward most wheel support unit.

35. A device in accordance with claim 3 wherein the latch means which latches and releases the at least one forward most wheel support unit in both said first and second positions is one and the same means.

36. A device in accordance with claim 3 wherein the forward most wheel support unit latch means is recessed within the side elevational profile of the support frame.

37. A device in accordance with claim 3 wherein the forward most wheel support unit latch means is mounted to the forward most wheel support unit.

38. A device in accordance with claim 3 wherein said forward most wheel support unit latching means include at least one spring-biased latch mounted to the wheel support unit.

39. A device in accordance with claim 3 wherein said forward most wheel support unit latching means include at least one spring-biased latch mounted to the support frame.

40. A device in accordance with claim 3 wherein said forward most wheel support unit latching means include at least one resiliently movable member.

41. A carrier device in accordance with claim 3 wherein the forward most wheel support unit, in the second, stowed position, serves to retain within the side-elevational profile of the support frame, a shaped section mounted to the support frame which accommodates at least one child's feet, when the shaped section is in a second, stowed position.

42. A carrier device in accordance with claim 21 wherein said wall structure's "U"-shaped handle has two stages and is adjustable by virtue of two corresponding adjustable pivot points mounted along the frame of said handle, permitting pivoting of one stage in relation to the other stage.

43. A carrier device in accordance with claim 24 wherein at least one set of child restraints is included within at least one wall structure portion shaped to form a seat back.

44. A wheeled carrier device comprising:

a support frame defining a side elevational profile and an outer perimeter including at least a partial retention base;

at least one wheel assembly affixed to said support frame, including a base and a plurality of walls perpendicular thereto, defining both a wheel assembly periphery and an interior cavity; which wheel assembly in the operative position substantially occupies the side elevational profile of the support frame and the wheel assembly further includes both wheel assembly mounting means and wheel attaching means interconnected to at least one wheel; and said wheel attaching means defining an elongate wheel support element connected to at least one wheel and the wheel's central axis of rotation, including a first lower end interconnected to the wheel's central axis of rotation, and an uppermost portion affixed to the wheel assembly, the uppermost portion terminating in a second end, and said wheel assembly including a terminal fixing member disposed near to the second end of the wheel support element which secures said support element to the wheel assembly; and housed at least partially within the wheel assembly are transversely disposed, oppositely extending mounting elements, which are received in adjacent facing portions of the carrier device support frame, about which the wheel assembly pivots, and the wheel assembly and interconnected wheel being movable between a first, latched operative position wherein said wheel is erected to provide rolling support for said carrier device and wherein the plane defined by said wheel assembly and interconnected wheel extends substantially orthogonally to the side elevational profile of the carrier device, and a second, stowed, latched position, the plane defined by said wheel assembly and interconnected wheel being swept through an angle during movement of said wheel assembly between said first and second positions such that the plane defined by the wheel assembly and interconnected wheel in the second position extends substantially parallel with the side elevational profile of said carrier device, and said wheel as well as it's central axis of rotation, in the second position, being disposed within the outer perimeter defined by the carrier device support frame, and in the second, stowed position of said wheel assembly it is at least close to perpendicular to said wheel assembly's first operative position; and at least one latching means which positively latches the wheel assembly against movement when in both the first and second positions, the latching means selectively engages a portion of the carrier device support frame and a portion of the wheel assembly in both the first and second positions.

* * * * *